(12) United States Patent
Park et al.

(10) Patent No.: US 8,773,647 B2
(45) Date of Patent: Jul. 8, 2014

(54) DEVICE FOR MEASURING SPEED OF MATERIAL

(75) Inventors: Yong Kook Park, Anyang-si (KR); Gap Soo Lim, Busan (KR)

(73) Assignee: Hyundai Steel Company, Incheon (KR)

( * ) Notice: Subject to any disclaimer, the term of this patent is extended or adjusted under 35 U.S.C. 154(b) by 165 days.

(21) Appl. No.: 13/376,821

(22) PCT Filed: Dec. 28, 2010

(86) PCT No.: PCT/KR2010/009409
§ 371 (c)(1),
(2), (4) Date: Dec. 7, 2011

(87) PCT Pub. No.: WO2011/093595
PCT Pub. Date: Aug. 4, 2011

(65) Prior Publication Data
US 2012/0085171 A1    Apr. 12, 2012

(30) Foreign Application Priority Data

Jan. 28, 2010 (KR) .................. 10-2010-0007687
Jan. 28, 2010 (KR) .................. 10-2010-0007688

(51) Int. Cl.
*G01P 3/36* (2006.01)
(52) U.S. Cl.
USPC ............ 356/28.5; 72/10.3; 702/142; 700/151

(58) Field of Classification Search
USPC .................. 359/28.5; 72/10.3; 702/142, 145; 700/151
See application file for complete search history.

(56) References Cited

U.S. PATENT DOCUMENTS

| 4,398,254 A * | 8/1983 | Kondo et al. ................. 700/155 |
| 6,263,714 B1 * | 7/2001 | Johnson et al. ................... 72/9.2 |
| 2001/0046042 A1* | 11/2001 | Theile et al. ..................... 356/28 |
| 2009/0282884 A1* | 11/2009 | Pawelski et al. ................ 72/201 |

FOREIGN PATENT DOCUMENTS

| JP | 05-123749 A | 5/1993 |
| JP | 08-071623 A | 3/1996 |
| JP | 09-113526 A | 5/1997 |
| JP | 2001-033466 A | 2/2001 |

OTHER PUBLICATIONS

International Search Report dated Aug. 29, 2011 of PCT/KR2010/009409 and its English Translation—5 pages.

* cited by examiner

*Primary Examiner* — Mark Hellner
(74) *Attorney, Agent, or Firm* — Knobbe Martens Olson & Bear LLP

(57) ABSTRACT

A device for measuring a speed of a material includes a body unit disposed at an exit side of a rolling stand and placed below a material which is transferred from the rolling stand; and a speed measuring unit installed on the body unit and constructed to measure a speed of the material transferred from the rolling stand.

15 Claims, 14 Drawing Sheets

DEVICE FOR MEASURING SPEED OF MATERIAL

BACKGROUND

1. Field

Embodiments of the present invention relate to a device for measuring the speed of a material, and more particularly, to a device for measuring the speed of a material, which can precisely measure the speed of a material transferred from a rolling stand.

2. Description of the Related Technology

In general, manufacture of steel includes an iron-making process for manufacturing pig iron, a steelmaking process for removing impurities from the pig iron, a continuous casting process for producing a solidified structure from molten state iron, and a rolling process for producing a steel plate or a wire rod.

Among the processes for producing steel from iron ore, the process for manufacturing pig iron, as an earlier stage, is referred to as iron-making, and the process for producing steel from pig iron is referred to as steelmaking. In the continuous casting process, molten state pig iron is poured into a mold, is passed through a continuous caster, and is cooled and solidified to continuously produce an intermediate material such as a slab or a bloom. In the rolling process, the intermediate material such as a slab and a bloom produced in the continuous casting process is passed between various rollers which rotate to continuously apply force and make the slab or the bloom long or thin. The rolling process is generally divided into a hot rolling process and a cold rolling process.

These statements are presented as a background art for facilitating the understanding of the present invention, and do not mean a relevant prior art generally known in the art to which the invention pertains.

SUMMARY

An embodiment of the present invention relates to a device for measuring the speed of a material, which can precisely measure a speed of a material transferred from a rolling stand, so as to make the transfer amount of the material uniform.

In one embodiment, a device for measuring a speed of a material includes: a body unit disposed at an exit side of a rolling stand and placed below a material which is transferred from the rolling stand; and a speed measuring unit installed on the body unit and constructed to measure a speed of the material transferred from the rolling stand.

Preferably, the device further includes: a protection unit constructed to cover the speed measuring unit; and a lift unit constructed to raise and lower the body unit.

More preferably, the lift unit includes: a rotation gear part installed on the body unit and rotated by driving of a driving member; and a rack gear part meshed with the rotation gear part and constructed to guide upward and downward movement of the rotation gear part.

More preferably, the speed measuring unit includes: a speedometer constructed to measure the speed of the material; and a displacement sensor constructed to sense a distance between the speedometer and the material.

More preferably, the speed measuring unit further includes: a fluid injecting section constructed to inject a fluid toward the material so that foreign substances adhered to the material are removed.

More preferably, the speedometer includes a laser Doppler speedometer.

More preferably, the body unit includes: a fixed member on which the speed measuring unit is installed; and a frame member constructed to support the fixed member, wherein the protection unit is mounted to the fixed member and prevents collision between the speed measuring unit and the material.

More preferably, the protection unit is formed into the shape of a cylinder which is laid down to a direction crossing with a transfer direction of the material, and a radius of the protection unit is larger than a length from a center of the fixed member to an outer end of the speed measuring unit.

More preferably, the protection unit is rotatably mounted to the fixed member.

More preferably, the protection unit includes: protection members mounted to the body unit to be capable of sliding movement and constructed to selectively cover the speed measuring unit; and an opening and closing member constructed to slide the protection members.

In another embodiment, a device for measuring a speed of a material includes: a body unit disposed at an exit side of a rolling stand and placed below a material which is transferred from the rolling stand; a speed measuring unit installed on the body unit and constructed to measure a speed of the material transferred from the rolling stand; and a roller unit rotatably mounted to the body unit and constructed to support the material transferred from the rolling stand.

Preferably, the speed measuring unit includes: a speedometer constructed to measure the speed of the material; and a fluid injecting section constructed to inject a fluid supplied from a fluid source toward the material and remove foreign substances adhered to the material.

More preferably, the speedometer includes a laser Doppler speedometer.

More preferably, the fluid injecting section is provided in a plural number in such a way as to surround the speedometer.

More preferably, the body unit includes a housing which is defined with an opening, and the speedometer and the fluid injecting section are installed in the housing and are exposed to an outside through the opening.

More preferably, the body unit further includes a closure member which is constructed to open and close the opening.

BRIEF DESCRIPTION OF THE DRAWINGS

The above and other aspects, features and other advantages will be more clearly understood from the following detailed description taken in conjunction with the accompanying drawings, in which.

DETAILED DESCRIPTION OF THE EMBODIMENTS

Hereinafter, a device for measuring the speed of a material in accordance with embodiments of the present invention will be described with reference to accompanying drawings. However, the embodiments are for illustrative purposes only and are not intended to limit the scope of the invention. The drawings are not to scale and the proportion of certain elements may be exaggerated for the purpose of illustration.

Figure 1:
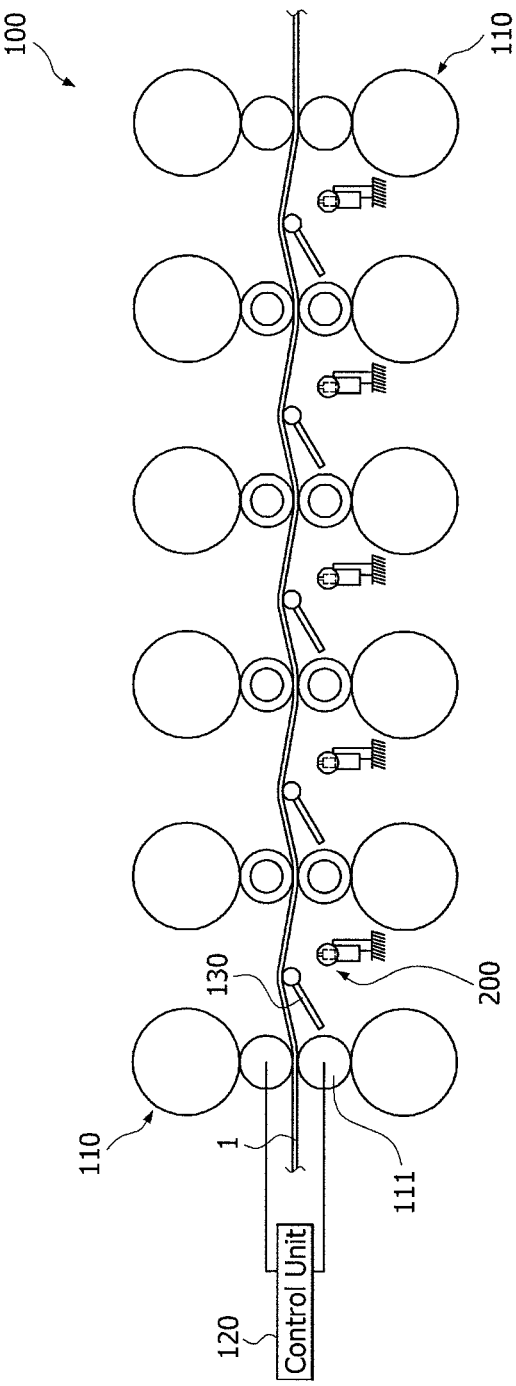
FIG. 1 is a side view illustrating a state in which a device for measuring the speed of a material in accordance with an embodiment of the present invention is installed.
Figure 2:
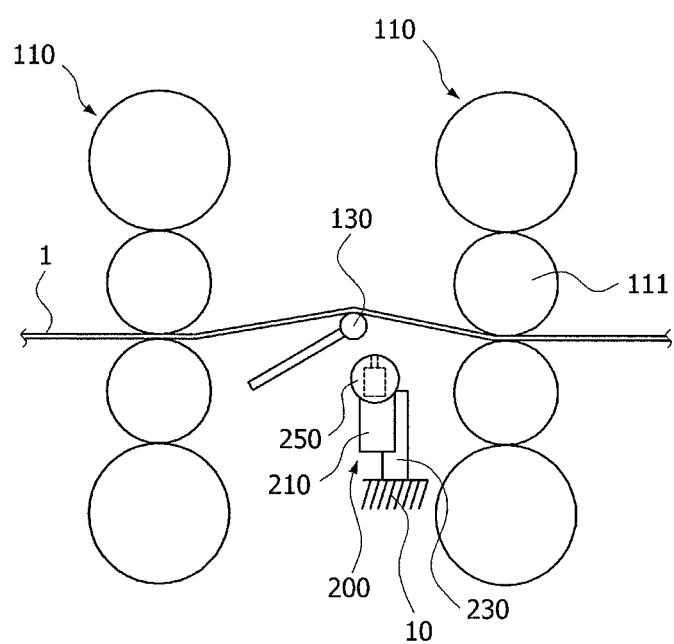
FIG. 2 is a side view schematically illustrating the device for measuring the speed of a material in accordance with the embodiment of the present invention.
Figure 3:
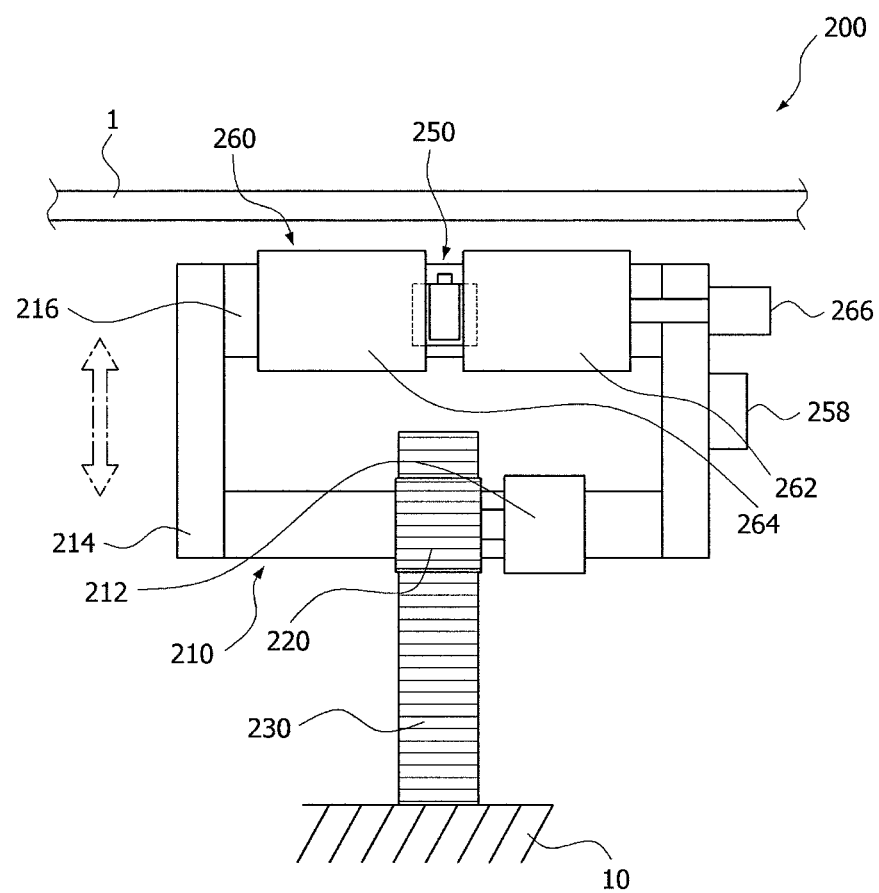
FIG. 3 is a front view schematically illustrating the device for measuring the speed of a material in accordance with the embodiment of the present invention.
Figure 4:
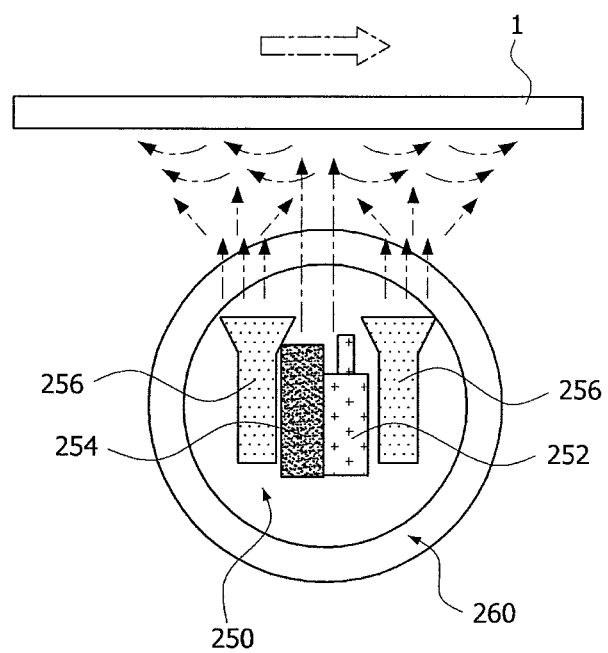
FIG. 4 is a cross-sectional view schematically illustrating the speed measuring unit of the device for measuring the speed of a material in accordance with the embodiment of the present invention.
Figure 5:
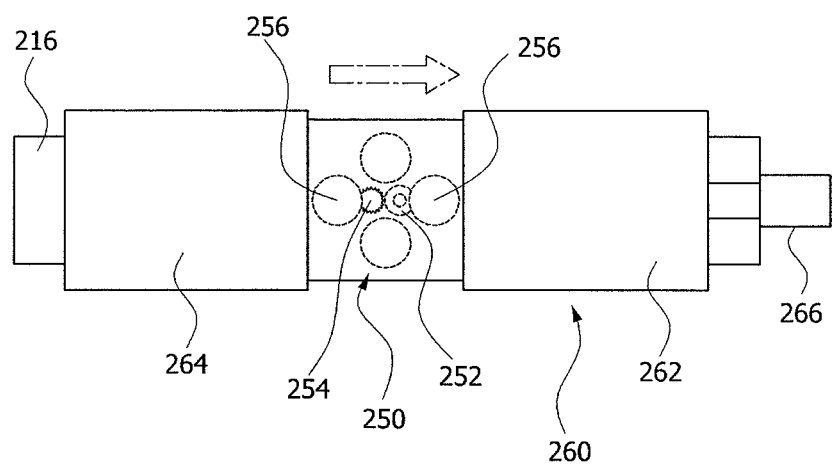
FIGS. 5 and 6 are views illustrating operating states of the protection unit of the device for measuring the speed of a material in accordance with the embodiment of the present invention.
Figure 6:
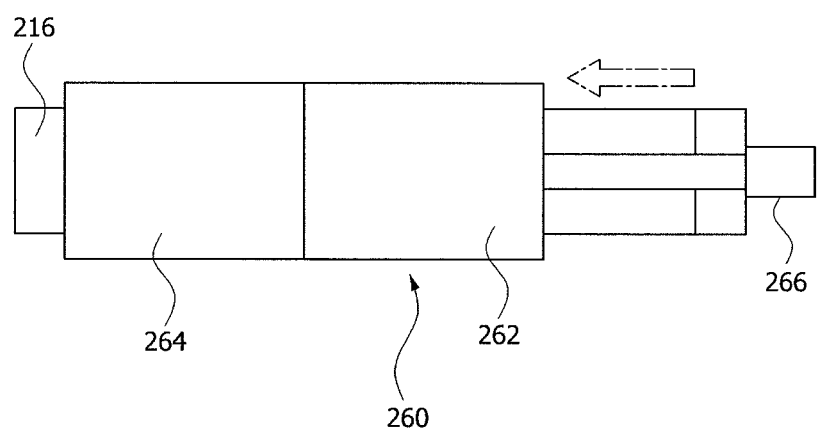
Figure 7:
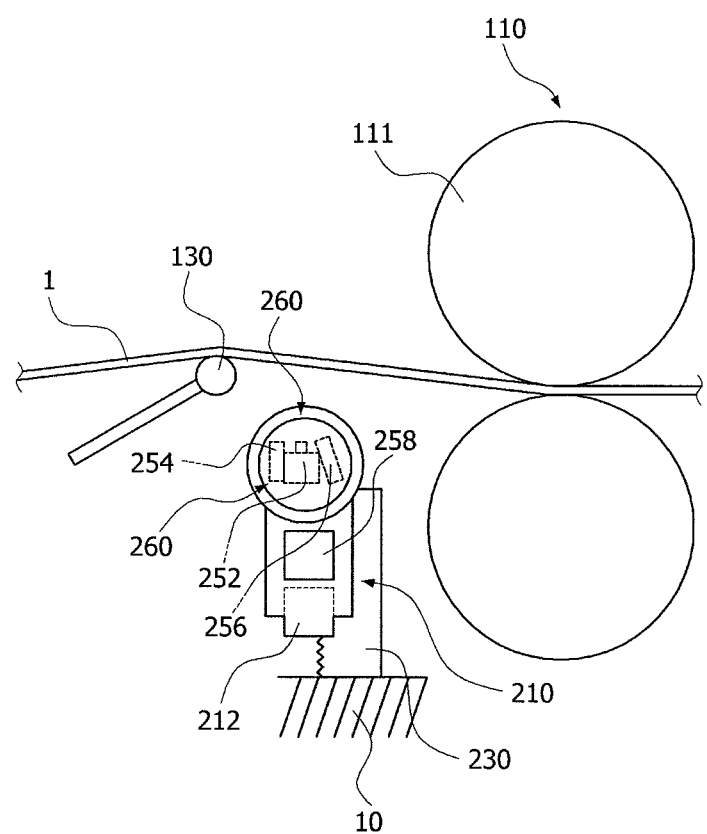
FIGS. 7 and 8 are views illustrating operating states of the device for measuring the speed of a material in accordance with the embodiment of the present invention.
Figure 8:
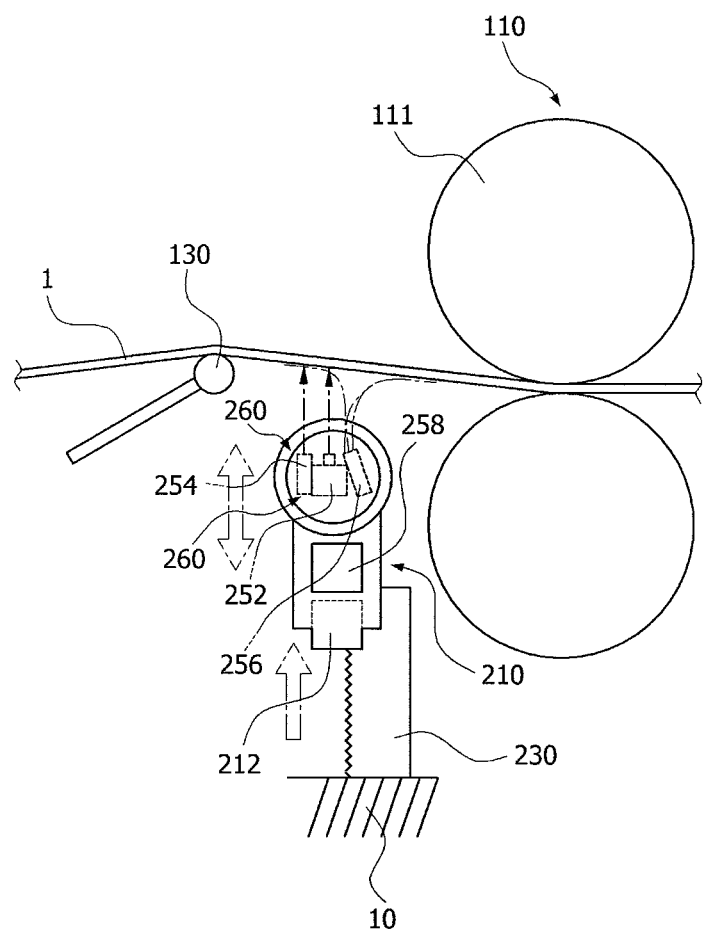
Figure 9:
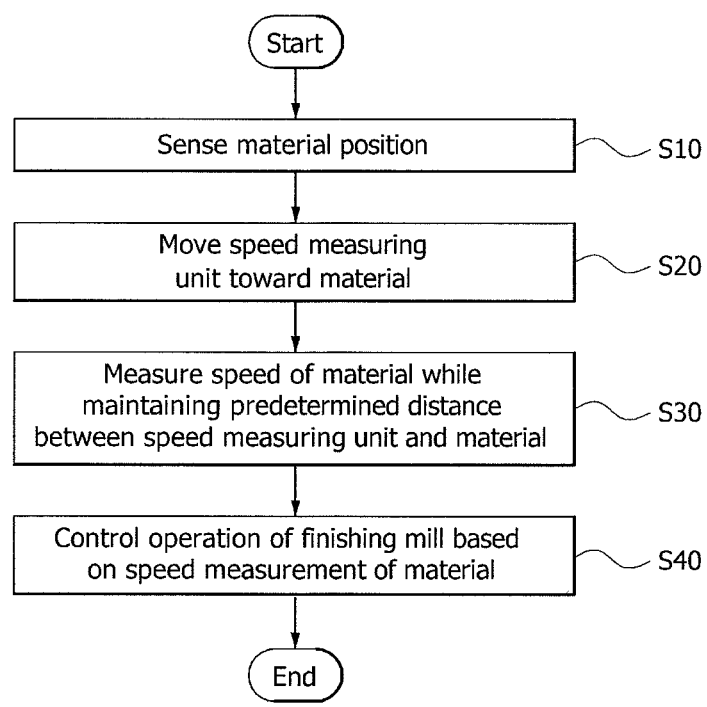
FIG. 9 is a flow chart showing a method for controlling a finishing mill using the device for measuring the speed of a material in accordance with the embodiment of the present invention.

FIG. 1 is a side view illustrating a state in which a device for measuring the speed of a material in accordance with an embodiment of the present invention is installed, FIG. 2 is a side view schematically illustrating the device for measuring the speed of a material in accordance with the embodiment of the present invention, FIG. 3 is a front view schematically illustrating the device for measuring the speed of a material in accordance with the embodiment of the present invention, FIG. 4 is a cross-sectional view schematically illustrating the speed measuring unit of the device for measuring the speed of a material in accordance with the embodiment of the present invention, FIGS. 5 and 6 are views illustrating operating states of the protection unit of the device for measuring the speed of a material in accordance with the embodiment of the present invention, FIGS. 7 and 8 are views illustrating operating states of the device for measuring the speed of a material in accordance with the embodiment of the present invention, and FIG. 9 is a flow chart showing a method for controlling a finishing mill using the device for measuring the speed of a material in accordance with the embodiment of the present invention.

Figure 10:
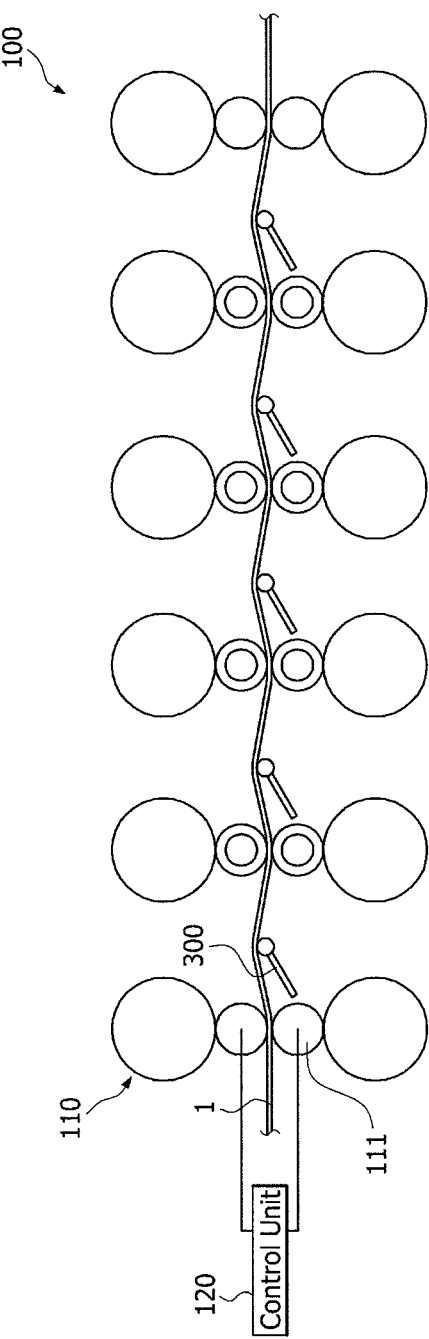
FIGS. 10 and 11 are side views illustrating a state in which a device for measuring the speed of a material in accordance with another embodiment of the present invention is installed.
Figure 11:
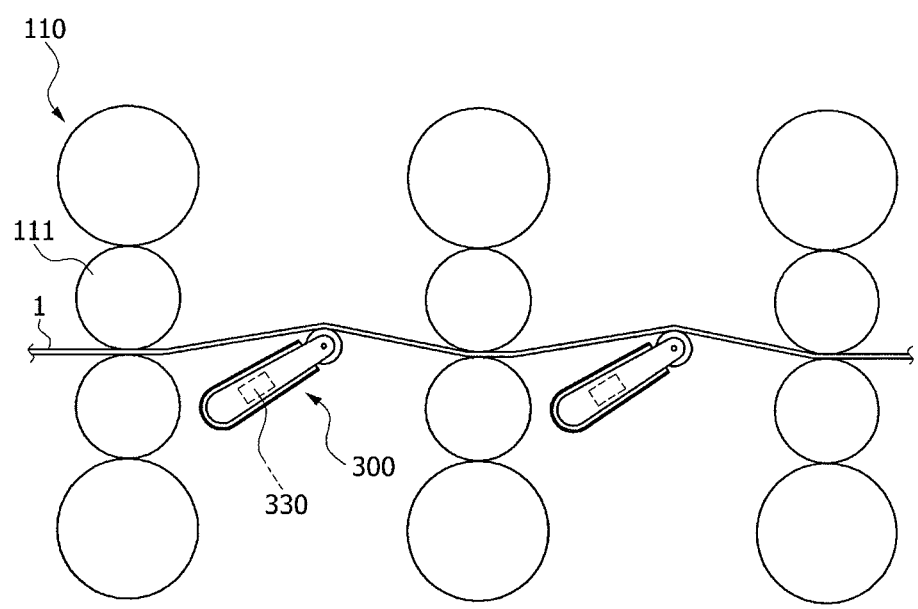
Figure 12:
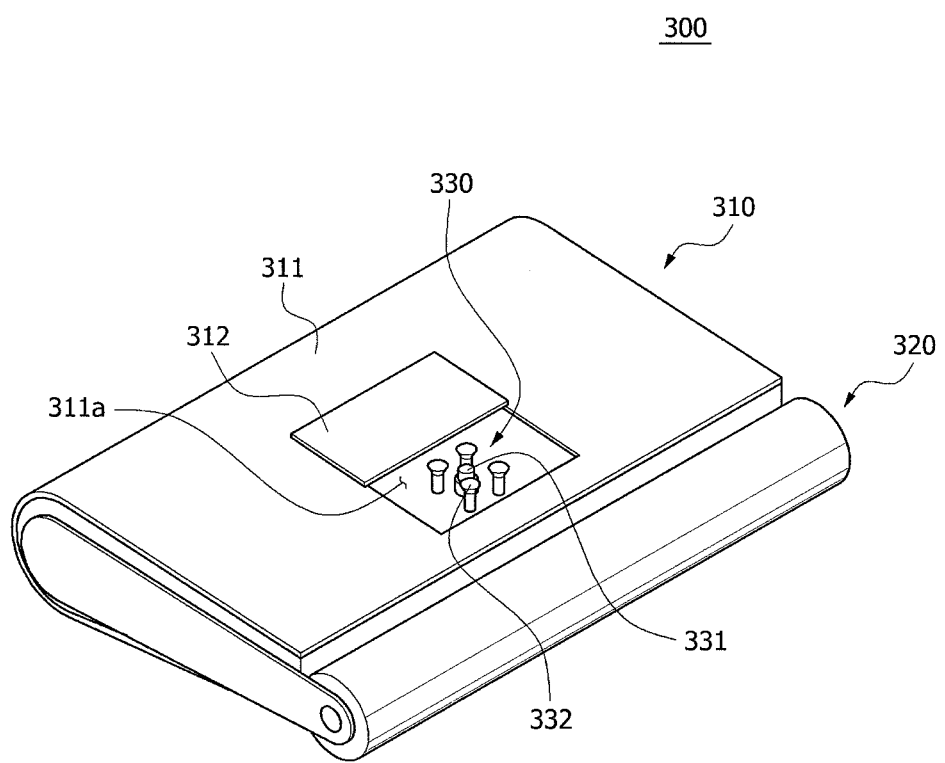
FIG. 12 is a perspective view schematically illustrating the device for measuring the speed of a material in accordance with another embodiment of the present invention.
Figure 13:
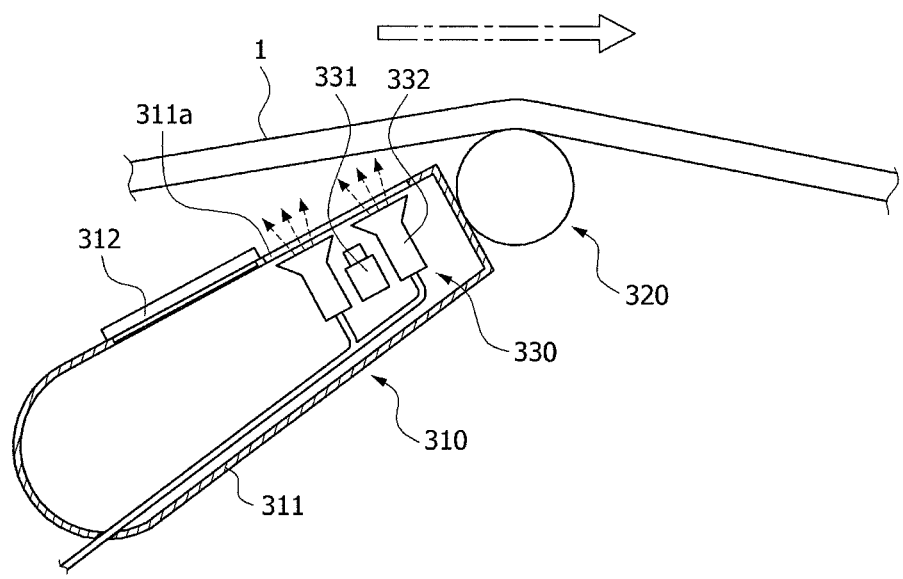
FIG. 13 is a cross-sectional view schematically illustrating the device for measuring the speed of a material in accordance with another embodiment of the present invention.
Figure 14:
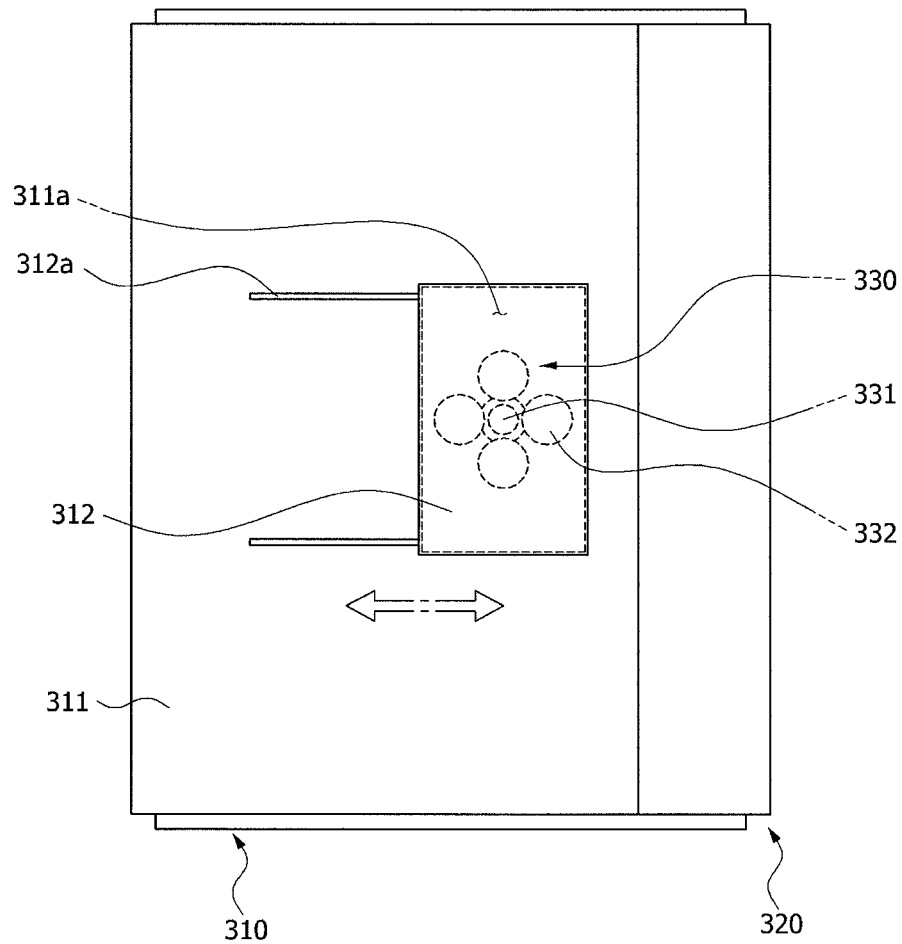
FIG. 14 is a plan view schematically illustrating the device for measuring the speed of a material in accordance with another embodiment of the present invention.

FIGS. 10 and 11 are side views illustrating a state in which a device for measuring the speed of a material in accordance with another embodiment of the present invention is installed, FIG. 12 is a perspective view schematically illustrating the device for measuring the speed of a material in accordance with another embodiment of the present invention, FIG. 13 is a cross-sectional view schematically illustrating the device for measuring the speed of a material in accordance with another embodiment of the present invention, and FIG. 14 is a plan view schematically illustrating the device for measuring the speed of a material in accordance with another embodiment of the present invention.

Referring to FIGS. 1 to 4, a device 200 for measuring the speed of a material in accordance with an embodiment of the present invention is disposed in a finishing mill 100 which has a plurality of rolling stands 110.

The finishing mill 100 functions to finally roll a material 1, which is primarily rolled in a roughing mill (not shown), into a desired dimension and shape. Such a finishing mill 100 has the plurality of rolling stands 110. In the present embodiment of the invention, the finishing mill 100 includes about six or seven rolling stands 110 which are continuously positioned at regular intervals of around 5 m.

In each rolling stand 110, rolling rolls 111 and a cooling device (not shown) are installed. The rolling rolls 111 roll the material 1, and the cooling device has sprays for spraying cooling water above and below the material 1 to control the temperature of the material 1 and remove scale from the surface of the material 1.

The operations of the rolling rolls 111 are controlled by a control unit 120. The control unit 120 controls the rolling loads and the rolling speeds of the rolling rolls 111 depending upon the speed measurements of the material 1 so as to set optimal rolling conditions.

A looper 130 is provided between adjacent rolling stands 110. The looper 130 is arranged below the material 1 which is transferred. When the material 1 is introduced between the rolling rolls 111, the looper 130 lifts upward the material 1 and provides a tension to the material 1.

The device 200 for measuring the speed of a material measures the speed of the material 1 which is transferred from the rolling stand 110. According to the present embodiment, the device 200 for measuring the speed of a material is provided in a plural number, and each device 200 for measuring the speed of a material is disposed at the exit side of each rolling stand 110.

The device 200 for measuring the speed of a material is placed below the material 1, and includes a body unit 210, a speed measuring unit or speed detector unit 250 and a protection unit or protector unit 260. The body unit 210 is installed to be capable of being moved upward and downward, and includes a driving member 212, a frame member 214 and a fixed member 216.

The driving member 212 includes a motor which generates power for moving the body unit 210 upward and downward, and is mounted to the frame member 214.

In the present embodiment, the frame member 214 is exemplified as being formed into the substantial shape of U. That is to say, the frame member 214 is constructed into a shape which includes a horizontal frame (not numbered) extending in the horizontal direction and a pair of side frames (not numbered) extending in the vertical direction from both ends of the horizontal frame.

The fixed member 216 is fixed to the frame member 214. The fixed member 216 is mounted to the distal ends of the side frames of the frame member 214 to extend in the horizontal direction. The speed measuring unit 250 is installed on the fixed member 216.

The device 200 for measuring the speed of a material further includes a raising and lowering unit or lift unit 220 and 230 for moving up or down the body unit 210. The raising and lowering unit 220 and 230 is constituted by a rotation gear part 220 and a rack gear part 230.

The rotation gear part 220 is installed to be connected with the driving member 212 and is rotated by receiving power from the driving member 212. The rack gear part 230 is fastened to an external device 10 and meshes with the rotation gear part 220 to guide the movement of the rotation gear part 220. Since the external device 10 is to fasten the rack gear part 230, the external device 10 may of course be replaced with a finishing mill 100 so long as the rack gear part 230 may be fastened.

In the present embodiment, the rack gear part 230 is exemplified as extending in the vertical direction and providing a vertical movement path. The rotation gear part 220 rotated by receiving power from the driving member 212 meshes with the rack gear part 230 and moves in the vertical direction. The body unit 210 is moved in the vertical direction by such movement of the rotation gear part 220.

Meanwhile, although it is illustrated in the present embodiment that the driving member 212 connected with the rotation gear part 220 is installed on the body unit 210 and the rack gear part 230 is fastened to the external device 10, it is to be noted that the present invention is not limited to such a structure. In other words, it is conceivable that the driving member 212 having the rotation gear part 220 installed thereon may be fastened to the external device 10 and the rack gear part 230 may be installed on the body unit 210, so that a variety of modifications for upward and downward movement of the body unit 210 may be contemplated.

The speed measuring unit 250 is installed on the body unit 210. In detail, the speed measuring unit 250 is installed on the fixed member 216 and functions to measure the speed of the material 1, and includes a speedometer 252, a displacement sensor 254 and fluid injecting sections or fluid injector sections 256.

The speedometer 252 measures the speed of the material 1. In the present embodiment, the speedometer 252 is exemplified as a laser Doppler speedometer. The laser Doppler speedometer is a speedometer which measures the speed of a material using a laser Doppler effect. The laser Doppler effect indicates a phenomenon that a frequency measurement varies as one or both of a laser generating position and a measuring position move. When a laser beam is radiated to a moving object, the laser beam scatters, and the scattered beam changes in frequency in proportion to the speed of the object. By measuring the changed frequency as an optical bit signal, the moving speed of the object may be calculated. Since the detailed structure and function of such a speedometer are well known to those skilled in the art, detailed description thereof will be omitted herein.

The displacement sensor 254 senses the distance between the speedometer 252 and the material 1. In the present embodiment, the displacement sensor 254 is exemplified as a laser displacement sensor. Such a displacement sensor 254 is installed at the same height as the speedometer 252, and may measure the distance between the surface of the material 1 and the speedometer 252 in real time by radiating a laser beam toward the surface of the material 1, receiving the laser beam reflected from the surface of the material 1 and calculating the distance to the material 1.

The fluid injection sections 256 function to inject a fluid with a high pressure to the material 1 and remove foreign substances. In the present embodiment, the fluid injected from the fluid injecting sections 256 is exemplified as air. Such fluid injecting sections 256 inject the fluid with the high pressure to the material 1 and remove the foreign substances such as water or scale present on the surface of the material 1. Further, the fluid injecting sections 256 function to remove steam produced due to contact between the material 1 and cooling water, between the material 1 and the speed measuring unit 250.

The speed measuring unit 250 further includes a driving control section 258. The driving control section 258 is connected with the displacement sensor 254 and controls the operation of the driving member 212.

The distance information between the surface of the material 1 and the speedometer 252 measured by the displacement sensor 254 is transmitted to the driving control section 258 in real time. The driving control section 258, which receives in real time the distance information between the surface of the material 1 and the speedometer 252 from the displacement sensor 254, controls the operation of the driving member 212 and maintains the distance between the surface of the material 1 and the speedometer 252 to a predetermined distance.

The device 200 for measuring the speed of a material includes the protection unit 260. The protection unit 260 is formed into a roller-like shape and is rotatably installed on the body unit 210. The protection unit 260 protects the speed measuring unit 250 from the material 1, and includes protection members 262 and 264 and an opening and closing member 266.

The protection members 262 and 264 are rotatably installed on the fixed member 216. In the present embodiment, the respective protection members 262 and 264 are exemplified as being divided into a first protection member 262 and a second protection member 264. The first protection member 262 and the second protection member 264 are installed to be rotatable about the fixed member 216, and can be rotated in the transfer direction of the material 1 when they are brought into contact with the material 1.

According to the present embodiment, the protection members 262 and 264 are formed in such a manner that the distance between the outer surfaces of the protection members 262 and 264 and the material 1 is shorter than the distance between the distal end of the speed measuring unit 250 and the material 1. Namely, the protection members 262 and 264 are formed to project more than the speed measuring unit 250 toward the material 1.

Accordingly, in the event that the material 1 is abruptly lowered toward the speed measuring unit 250, the protection members 262 and 264 are first brought into contact with the material 1 to prevent the occurrence of collision between the material 1 and the speed measuring unit 250, whereby it is possible to prevent the speed measuring unit 250 from being broken by the material 1.

Referring to FIGS. 5 and 6, as the protection members 262 and 264 slide leftward and rightward, they expose the speed measuring unit 250 to an outside or prevent the exposure of the speed measuring unit 250 to the outside. When the first protection member 262 and the second protection member 264 are brought into contact with each other, the speed measuring unit 250 is prevented from being exposed to the outside, and when the first protection member 262 and the second protection member 264 slide away from each other, the speed measuring unit 250 is exposed toward the material 1 in the space between the first protection member 262 and the second protection member 264.

The opening and closing member 266 drives the first protection member 262 under the control of the driving control section 258 and selectively exposes the speed measuring unit 250 to the outside. According to the present embodiment, the opening and closing member 266 includes a hydraulic cylinder which is connected with the first protection member 262. The opening and closing member 266 selectively exposes the speed measuring unit 250 to the outside, by moving the first protection member 262 in the direction facing the second protection member 264 or in the direction facing away from the second protection member 264, using the power generated by the hydraulic cylinder.

While it is exemplified in the present embodiment that the opening and closing member 266 is connected with and moves the first protection member 262, it is to be noted that the present invention is not limited to such. That is to say, the opening and closing member 266 may selectively expose the speed measuring unit 250 to the outside by being connected with and moving the second protection member 264, or may selectively expose the speed measuring unit 250 to the outside by being connected with and moving both the first protection member 262 and the second protection member 264, so that a variety of modifications may be contemplated.

The protection unit 260, which selectively exposes the speed measuring unit 250 to the outside, protects the speed measuring unit 250 from foreign substances such as dust or the like. In other words, when the speed measuring unit 250 does not operate, the protection unit 260 prevents the speed measuring unit 250 from being exposed to the outside so that it is possible to prevent foreign substances such as cooling water or scale dropping toward the speed measuring unit 250 from reaching the speed measuring unit 250. In this way, the protection unit 260 protects the speed measuring unit 250 from foreign substances.

When the speed measuring unit 250 operates, the protection unit 260 allows the speed measuring unit 250 to be exposed toward the material 1 such that the speed measuring unit 250 can perform the operation of measuring the speed of the material 1.

Hereafter, a method for measuring the speed of a material using the device 200 for measuring the speed of a material in accordance with the embodiment of the present invention will be described with reference to FIGS. 1 to 9.

In order to measure the speed of the material 1 using the device 200 for measuring the speed of a material, the position of the material 1 which is being transferred is sensed (S10). Namely, the device 200 for measuring the speed of a material, which is disposed between adjacent rolling stands 110 of the finishing mill 100, starts to perform an operation for measuring the speed when the entrance of the material 1 into a corresponding rolling stand 110, that is, the rolling stand 110 positioned immediately upstream of the device 200 for measuring the speed of a material, is sensed.

In the present embodiment, the entrance of the material 1 is sensed by the rolling rolls 111. When the material 1 enters the rolling stand 110 and is brought into contact with the rolling rolls 111, the entrance of the material 1 is sensed.

When the sensed material 1 is transferred to a predetermined position, the device 200 for measuring the speed of a material, which is disposed below the material 1, is moved toward the material 1 so that the predetermined distance is maintained between the material 1 and the speed measuring unit 250 (S20).

In the present embodiment, the predetermined position is exemplified as a position of the speed measuring unit 250 that is separated from the upstream rolling stand 110 in the downstream direction so as to allow the speed measuring unit 250 according to the present embodiment to effectively measure the speed of the material 1, and the predetermined distance is exemplified as a distance between the material 1 and the speed measuring unit 250 which allows the speed measuring unit 250, according to the present embodiment, to precisely measure the speed of the material 1.

Since the predetermined position and the predetermined distance may be appropriately controlled in consideration of the transfer speed of the material 1, etc., description of concrete dimensions of the predetermined position and the predetermined distance will be omitted herein.

According to the present embodiment, the movement of the speed measuring unit 250 is implemented through the operation of the driving member 212. That is to say, if the looper 130 senses the entrance of the material 1 and transmits a signal to the driving control section 258, the driving control section 258, which receives the signal transmitted from the looper 130, controls the operation of the driving member 212 such that the body unit 210 is moved upward in the direction facing the material 1, and the speed measuring unit 250 is moved toward the material 1 by the body unit 210 moved in this way.

Further, the driving control section 258 controls the operation of the protection unit 260 and exposes the speed measuring unit 250 to the outside. In other words, the driving control section 258 controls the operation of the opening and closing member 266 to slide the protection members 262 and 264 such that the speed measuring unit 250 is exposed to the outside and may perform the operation of measuring the speed of the material 1.

In the meanwhile, if it is not necessary to operate the speed measuring unit 250, the driving control section 258 controls the operation of the protection unit 260 such that the speed measuring unit 250 is not exposed to the outside. Namely, the driving control section 258 controls the operation of the opening and closing member 266 to cause the protection members 262 and 264 not to expose the speed measuring unit 250 to the outside, thereby protecting the speed measuring unit 250 from foreign substances.

If the speed measuring unit 250 is moved toward the material 1, the driving control section 258 operates the speed measuring unit 250. According to this fact, the speedometer 252 starts to measure the speed of the material 1, and together with this, the fluid injecting sections 256 inject the fluid with a high pressure to the surface of the material 1 and remove the foreign substances such as water or scale present on the surface of the material 1 and steam, between the material 1 and the speed measuring unit 250.

The speed measuring unit 250 moved toward the material 1 measures the speed of the material 1 while the predetermined distance between the speedometer 252 and the material 1 is maintained (S30). The maintenance of the predetermined distance between the speedometer 252 and the material 1 is implemented by the displacement sensor 254.

While the speedometer 252 measures the speed of the material 1, the displacement sensor 254 measures the distance between the surface of the material 1 and the speedometer 252 in real time. The distance information between the surface of the material 1 and the speedometer 252 measured by the displacement sensor 254 is transmitted to the driving control section 258 in real time.

The driving control section 258, which receives the distance information between the surface of the material 1 and the speedometer 252 transmitted from the displacement sensor 254, controls the operation of the driving member 212 and maintains the predetermined distance between the surface of the material 1 and the speedometer 252. That is to say, in the event that the material 1 is upwardly transferred when compared to a reference point, the driving control section 258 correspondingly operates the driving member 212 and upwardly moves the speedometer 252. Conversely, in the event that the material 1 is downwardly transferred when compared to the reference point, the driving control section 258 correspondingly operates the driving member 212 and downwardly moves the speedometer 252.

Through the above-described operation of the fluid injecting sections 256 and the maintenance of the predetermined distance between the speedometer 252 and the material 1 by the displacement sensor 254, the speedometer 252 may precisely measure the speed of the material 1.

The control unit 120, which receives the speed measurements of the material 1 transmitted from a plurality of devices 200 for measuring the speed of a material, controls the operation of the finishing mill 100 on the basis of the speed measurements of the material 1 (S40). The control unit 120 generates control data for controlling operations of respective rolling stands 110 on the basis of the speed measurements, and individually controls the operations of the respective rolling stands 110 using the control data.

In other words, the control unit 120 controls individually the operations of corresponding devices 200 for measuring the speed of a material and the rolling stands 110 disposed upstream of the devices 200 for measuring the speed of a material, for example, the rolling loads and the rolling speeds of the rolling rolls 111, according to the speed measurements received from the respective devices 200 for measuring the speed of a material.

While it is exemplified in the present embodiment that the control unit 120 controls the operation of the rolling stand 110 disposed upstream of a corresponding device 200 for measuring the speed of a material which has transmitted the speed measurement of the material 1, the present invention is not limited to such. Therefore, it is conceivable that the control unit 120 can control the operation of the rolling stand 110 disposed downstream of the corresponding device 200 for measuring the speed of a material which has transmitted the speed measurement of the material 1, so that a variety of modifications may be contemplated.

Due to the fact that the control unit 120 may control individually the respective rolling stands 110 using the speed measurements of the material 1 at respective positions, it is possible to control the plurality of rolling stands 110 such that the plurality of rolling stands 110 are placed under conditions appropriate for the plurality of rolling stands 110 to roll the material 1, whereby precision of control may be improved.

As can be readily seen from the above descriptions, the device 200 for measuring the speed of a material according to the embodiment of the present invention provides advantages in that, since the speed of the material 1 may be precisely measured at the exit side of each rolling stand 110, the finishing mill 100 may operate under optimum conditions. Namely, since the speeds of the rolling rolls 111 of respective rolling stands 110 may be controlled in real time on the basis of the speed measurements of the material 1 and the transfer amounts of the material 1 may be made uniform, it is possible to resolve the problems resulting from inferior quality of the material, such as malfunction of the device, overlapping of the material, breakage of the material, and so forth.

Also, since the speedometer 252 measures the speed of the material 1 with the predetermined distance maintained between the material 1 and the speedometer 252 and speed measurement is not impeded by the foreign substances such as water or scale present on the surface of the material 1, precision of speed measurement may be improved.

Further, because collision between the material 1 and the speed measuring unit 250 is prevented by the protection unit 260, breakage of the speed measuring unit 250 may be suppressed, whereby the lifetime of the speed measuring unit 250 may be extended.

Moreover, because the speed measuring unit 250 may be selectively exposed to the outside by using the protection unit 260, it is possible to protect the speed measuring unit 250 from foreign substances.

Hereinbelow, a device for measuring the speed of a material in accordance with another embodiment of the present invention will be described with reference to FIGS. 10 to 14, and descriptions to be repeated when compared to the aforementioned embodiment will be omitted herein.

A device 300 for measuring the speed of a material in accordance with another embodiment of the present invention is constructed using a looper, and includes a body unit 310 and a roller unit 320.

The device 300 for measuring the speed of a material is disposed in a finishing mill 100 which has a plurality of rolling stands 110.

The body unit 310 has a speed measuring unit 330 and is arranged at the exit side of each rolling stand 110. Thus, the speed of a material 1, which is transferred from the rolling stand 110, may be measured through the speed measuring unit 330.

The body unit 310 includes a housing 311 which is defined with an opening 311a and a closure member 312 which selectively opens and closes the opening 311a.

A space part is defined in the housing 311, and the speed measuring unit 330 is installed in the space part. The space part communicates upwardly with the opening 311a, and the speed measuring unit 330 may be exposed to an outside through the opening 311a.

The closure member 312 is installed at the upper part of the housing 311 and selectively opens and closes the opening 311a. In the present embodiment, the closure member 312 is slidingly moved in directions facing and facing away from the roller unit 320 to allow and prevent exposure of the speed measuring unit 330 to an outside.

In the case where the closure member 312 closes the opening 311a, the speed measuring unit 330 is not exposed to the outside, and in the case where the closure member 312 is slidingly moved in the direction facing away from the roller unit 320 and opens the opening 311a, the speed measuring unit 330 is exposed to the outside.

Hence, when it is necessary to operate the speed measuring unit 330, the closure member 312 opens the openings 311a such that the speed measuring unit 330 is exposed to the outside. Conversely, when it is not necessary to operate the speed measuring unit 330, the closure member 312 closes the opening 311a such that the speed measuring unit 330 is not exposed to the outside. In this way, it is possible to prevent foreign substances such as dust and the like from accumulating on the speed measuring unit 330.

Such opening and closing operations of the closure member 312 may be implemented by a driving section (not shown) connected to the closure member 312 to provide opening and closing drive force to the closure member 312 and a driving control section (not shown) for controlling the operation of the driving section.

In order to ensure smooth opening and closing operations of the closure member 312, guide rails 312a may be provided to the housing 311 to guide the sliding movement of the closure member 312. Also, in order to prevent the closure member 312 from being excessively moved forward or rearward, stoppers (not shown) may be provided to the housing 311.

The speed measuring unit 330 is installed in the space part defined in the housing 311, and includes a speedometer 331 and fluid injecting sections 332.

The speedometer 331 measures the speed of the material 1 which is transferred from the rolling stand 110, and is exposed to the outside through the opening 311a. In the present embodiment, the speedometer 331 is exemplified as a laser Doppler speedometer.

The fluid injecting sections 332 inject a fluid supplied from an external fluid source (not shown) toward the material 1 at a high pressure and remove the foreign substances adhered to the surface of the material 1, and are exposed to the outside through the opening 311a. In the present embodiment, the fluid injected from the fluid injecting sections 332 is exemplified as air. These fluid injecting sections 332 inject air with a high pressure to the material 1 and remove the foreign substances such as water or scale present on the surface of the material 1, and removes steam produced due to contact between the material 1 and cooling water, between the material 1 and the speedometer 331.

The fluid injecting sections 332 are provided in a plural number in such a way as to surround the speedometer 331. In the present embodiment, the fluid injecting sections 332 are arranged on the front, rear, left and right sides of the speedometer 331 and prevent the foreign substances present on the surface of the material 1 and steam from dropping onto the speedometer 331. Because there is no reason to limit the number of fluid injecting sections 332 to four, the fluid injecting sections 332 may be disposed in the number of 3 or below or in the number of 5 or over.

The roller unit 320 is rotatably mounted to one end of the body unit 310 and supports the material 1 which is transferred from the rolling stand 110. Such a roller unit 320 may be constituted by a single roll or a split type roll in which a plurality of rolls are arranged in line.

Hereafter, operations of the device 300 for measuring the speed of a material in accordance with another embodiment of the present invention will be described with reference to FIGS. 10 to 14.

In order to measure the speed of the material 1, the position of the material 1 which is being transferred is sensed. Namely, the speed measuring unit 330 disposed at the exit side of the rolling stand 110 of the finishing mill 100 starts to perform an operation for measuring the speed when the entrance of the material 1 into a corresponding rolling stand 110, that is, the rolling stand 110 positioned immediately upstream of the device 300 for measuring the speed of a material, is sensed.

In the present embodiment, the entrance of the material 1 is sensed by the rolling rolls 111. When the material 1 enters the rolling stand 110 and is brought into contact with the rolling rolls 111, the entrance of the material 1 is sensed.

At the same time the entrance of the material 1 is sensed, the closure member 312, which is closing the opening 311a of the housing 311, is slidingly moved in the direction facing away from the roller unit 320 and opens the opening 311a. Due to this fact, the speed measuring unit 330 is exposed to the outside. At the same time the opening 311a is open, the speed measuring unit 330 performs the operation of measuring the speed of the material 1.

When it is not necessary to operate the speed measuring unit 330, the driving control section controls the closing movement of the closure member 312 not to expose the speed measuring unit 330 to the outside and at the same time turns off the speed measuring unit 330.

If the speed measuring unit 330 is operated by the opening movement of the closure member 312, the speed measuring unit 330 starts to measure the speed of the material 1, and together with this, the fluid injecting sections 332 inject the fluid with a high pressure to the surface of the material 1 and remove the foreign substances such as water or scale present on the surface of the material 1 and steam, between the material 1 and the speedometer 331.

Due to such operations of the fluid injecting sections 332, the speedometer 331 may precisely measure the speed of the material 1.

The control unit 120, which receives the speed measurements of the material 1 transmitted from respective devices 300 for measuring the speed of a material, that is, from a plurality of speed measuring units 330 installed on loopers, controls the operation of the finishing mill 100 on the basis of the speed measurements of the material 1. The control unit 120 generates control data for controlling operations of respective rolling stands 110 on the basis of the speed measurements, and individually controls the operations of the respective rolling stands 110 using the control data.

In other words, the control unit 120 controls individually the operations of the rolling stands 110 disposed upstream of corresponding speed measuring units 330, for example, the rolling loads and the rolling speeds of the rolling rolls 111, according to the speed measurements received from the respective speed measuring units 330.

While it is exemplified in the present embodiment that the control unit 120 controls the operation of the rolling stand 110 disposed upstream of a corresponding speed measuring unit 330 which has transmitted the speed measurement of the material 1, the present invention is not limited to such. Therefore, it is conceivable that the control unit 120 may control the operation of the rolling stand 110 disposed downstream of the corresponding speed measuring unit 330 which has transmitted the speed measurement of the material 1, so that a variety of modifications may be contemplated.

Due to the fact that the control unit 120 may control individually the respective rolling stands 110 using the speed measurements of the material 1 at respective positions, it is possible to control the plurality of rolling stands 110 such that the plurality of rolling stands 110 are placed under conditions appropriate for the plurality of rolling stands 110 to roll the material 1, whereby precision of control may be improved.

As can be readily seen from the above descriptions, the device 300 for measuring the speed of a material according to another embodiment of the present invention provides advantages in that, since the speed measuring unit 330 according to the present embodiment may installed on the looper and may precisely measure the speed of the material 1 at the exit side of each rolling stand 110, the finishing mill 100 may operate under optimum conditions. That is to say, since the speeds of the rolling rolls 111 of respective rolling stands 110 may be controlled in real time on the basis of the speed measurements of the material 1 and the transfer amounts of the material 1 may be made uniform, it is possible to resolve the problems resulting from inferior quality of the material, such as malfunction of the device, overlapping of the material, breakage of the material, and so forth.

Also, since speed measurement is not impeded by the foreign substances such as water or scale present on the surface of the material 1 due to the presence of the fluid injecting sections 332, precision of speed measurement may be improved.

Further, because the speed measuring unit 330 may be selectively exposed to the outside by using the closure member 312, it is possible to protect the speed measuring unit 330 from foreign substances.

As is apparent from the above descriptions, the device for measuring the speed of a material according to the embodiments of the present invention provides advantages in that, since the speed of a material transferred from a rolling stand may be precisely measured and the transfer amount of the material may be made uniform on the basis of the speed measurement, it is possible to resolve the problems resulting from inferior quality of the material, such as malfunction of the device, overlapping of the material, breakage of the material, and so forth.

Also, in the device for measuring the speed of a material according to the embodiments of the present invention, since a speedometer measures the speed of the material while a predetermined distance is reliably maintained between the speedometer and the material, it is possible to precisely measure the speed of the material.

Further, in the device for measuring the speed of a material according to the embodiments of the present invention, since the speed of the material is measured while removing foreign substances such as water, scale and the like present on the surface of the material, the precision of measuring the speed of the material may be improved.

Moreover, in the device for measuring the speed of a material according to the embodiments of the present invention, since it is possible to prevent the material and a speed measuring unit from colliding against each other by a protection unit even when the material is abruptly lowered, the durability and the lifetime of the speed measuring unit may be improved.

Furthermore, in the device for measuring the speed of a material according to the embodiments of the present invention, since the speed measuring unit may be covered by selectively opening and closing the protection unit, it is possible to prevent foreign substances such as dust and the like from accumulating on the speed measuring unit.

In addition, in the device for measuring the speed of a material according to the embodiments of the present invention, since the speed measuring unit may be covered by selectively opening and closing a closure member, it is possible to prevent foreign substances such as dust and the like from accumulating on the speed measuring unit.

The embodiments of the present invention have been disclosed above for illustrative purposes. Those skilled in the art will appreciate that various modifications, additions and substitutions are possible. For example, while a device for measuring the speed of a material in a finishing mill has been exemplarily described, this is for an illustration purpose only, and the technical concept of the present invention may be applied to a rolling mill other than the finishing mill, such as a roughing mill. Therefore, the true scope of the present invention should be defined on the basis of the appended claims.

What is claimed is:

1. A device for measuring a speed of a material, the device comprising:
    a body disposed at an exit side of a rolling stand and placed below a material which is transferred from the rolling stand;
    a speed detector installed on the body and configured to measure a speed of the material transferred from the rolling stand; and
    a protector configured to cover the speed detector; and
    a lift configured to move up or down the body.

2. The device according to claim 1, wherein the lift comprises:
    a rotation gear installed on the body and rotated by driving of a driving member; and
    a rack gear engaged with the rotation gear and configured to guide upward and downward movement of the rotation gear.

3. The device according to claim 1, wherein the speed detector comprises:
    a speedometer configured to measure the speed of the material; and
    a displacement sensor configured to sense a distance between the speedometer and the material.

4. The device according to claim 3, wherein the speed detector further comprises:
    a fluid injector configured to inject a fluid toward the material so that foreign substances adhered to the material are removed.

5. The device according to claim 3, wherein the speedometer comprises a laser Doppler speedometer.

6. The device according to claim 1, wherein the body comprises:
    a fixed member on which the speed detector is installed; and
    a frame member configured to support the fixed member,
        wherein the protector is mounted to the fixed member and is configured to prevent collision between the speed detector and the material.

7. The device according to claim 6, wherein the protector is formed into the shape of a cylinder which is laid down to a direction crossing with a transfer direction of the material, and wherein a radius of the protector is larger than a length from a center of the fixed member to an outer end of the speed detector.

8. The device according to claim 7, wherein the protector is rotatably mounted to the fixed member.

9. The device according to claim 1, wherein the protector comprises:
    protection members mounted to the body to be capable of sliding movement and configured to selectively cover the speed detector; and
    an opening and closing member configured to slide the protection members.

10. A device for measuring a speed of a material, the device comprising:
    a body disposed at an exit side of a rolling stand and placed below a material which is transferred from the rolling stand;
    a speed detector installed on the body and configured to measure a speed of the material transferred from the rolling stand; and
    a roller rotatably mounted to the body and configured to support the material transferred from the rolling stand.

11. The device according to claim 10, wherein the speed detector comprises:
    a speedometer configured to measure the speed of the material; and
    a fluid injector configured to inject a fluid supplied from a fluid source toward the material and remove foreign substances adhered to the material.

12. The device according to claim 11, wherein the speedometer comprises a laser Doppler speedometer.

13. The device according to claim 11, wherein the fluid injector is provided in a plural number in such a way as to surround the speedometer.

14. The device according to claim 11, wherein the body comprises a housing which is defined with an opening, and wherein the speedometer and the fluid injector are installed in the housing and are exposed to an outside through the opening.

15. The device according to claim 14, wherein the body further comprises a closure member which is configured to open and close the opening.

* * * * *